(12) United States Patent
Vangemert et al.

(10) Patent No.: US 6,973,561 B1
(45) Date of Patent: Dec. 6, 2005

(54) PROCESSOR PIPELINE STALL BASED ON DATA REGISTER STATUS

(75) Inventors: Rene Vangemert, San Jose, CA (US); Frank Worrell, San Jose, CA (US); Gagan V. Gupta, Union City, CA (US)

(73) Assignee: LSI Logic Corporation, Milpitas, CA (US)

( * ) Notice: Subject to any disclaimer, the term of this patent is extended or adjusted under 35 U.S.C. 154(b) by 533 days.

(21) Appl. No.: 09/729,508

(22) Filed: Dec. 4, 2000

(51) Int. Cl.[7] .............................................. G06F 11/00
(52) U.S. Cl. ...................................... 712/219; 712/217
(58) Field of Search ................................ 712/217, 219, 712/27, 25, 201

(56) References Cited

U.S. PATENT DOCUMENTS

| | | | | |
|---|---|---|---|---|
| 5,193,167 A | * | 3/1993 | Sites et al. .................... | 711/163 |
| 5,542,109 A | * | 7/1996 | Blomgren et al. ........... | 712/234 |
| 5,590,294 A | * | 12/1996 | Mirapuri et al. ............ | 712/244 |
| 5,724,533 A | * | 3/1998 | Kuslak et al. ............... | 712/205 |
| 5,815,420 A | * | 9/1998 | Steiss .......................... | 708/524 |
| 6,240,508 B1 | * | 5/2001 | Brown et al. ................ | 712/219 |
| 6,304,955 B1 | * | 10/2001 | Arora .......................... | 712/217 |
| 6,308,261 B1 | * | 10/2001 | Morris et al. ................ | 712/219 |

OTHER PUBLICATIONS

The Authoritative Dictionary of IEEE Standards Terms; STandards Information Network, IEEE Press; 2000; pp. 267, 271, and 949.*
Webster's Ninth New Collegiate Dictionary, 1990, Merriam-Webster Inc, p. 1290.*

* cited by examiner

Primary Examiner—Eric Coleman
(74) Attorney, Agent, or Firm—Christopher P. Maiorana PC

(57) ABSTRACT

A method of recovering from loading invalid data into a register within a pipelined processor. The method comprises the steps of (A) setting a register status for the register to an invalid state in response to loading invalid data into the register and (B) stalling the processor in response to an instruction requiring data buffered by the register and the register status being in the invalid state.

22 Claims, 4 Drawing Sheets

PROCESSOR PIPELINE STALL BASED ON DATA REGISTER STATUS

FIELD OF THE INVENTION

The present invention relates to a method and/or architecture for Reduced Instruction Set Computer (RISC) Central Processing Unit (CPU) cores generally and, more particularly, to a method and/or architecture for handling data cache misses on a RISC CPU core.

BACKGROUND OF THE INVENTION

Two features are important to have a pipelined processor operate at a high performance level (i) the processor should operate at a highest possible frequency and (ii) the number of stall cycles should be minimized.

Pipelined processors use a data cache to feed the pipeline with data quickly. Caching minimizes delays caused by memory and system bus latency by keeping the most probably needed data readily available to the pipeline. When the required data is found in the cache (e.g., a cache-hit) then the data can be immediately loaded into a register within the pipeline and execution can continue. When the required data is not found in the cache (e.g., a cache-miss) then the processor is stalled while the data is obtained from main memory. This stall takes place though the data may not be immediately required for proper execution of the instructions.

In general, a bigger cache will give a higher hit-rate and thus provide better performance due to fewer stalls. Bigger caches, however, come at the expense of increased silicon usage and added implementation difficulties that may reduce the maximum operating frequency. It is therefore desirable to find a balance between performance (high cache-hit rate, low cache-miss penalty) and cost (small silicon area and minimal design effort and risk).

SUMMARY OF THE INVENTION

The present invention concerns a method of recovering from loading invalid data into a register within a pipelined processor. The method comprises the steps of (A) setting a register status for the register to an invalid state in response to loading invalid data into the register, and (B) stalling the processor in response to an instruction requiring data buffered by the register and the register status being in the invalid state.

The objects, features and advantages of the present invention include providing a method and an architecture that allows the processor to operate at a higher performance level by minimizing the number of stall cycles required to correct invalid data, and allowing the processor to continue executing as long as possible in the presence of invalid data.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
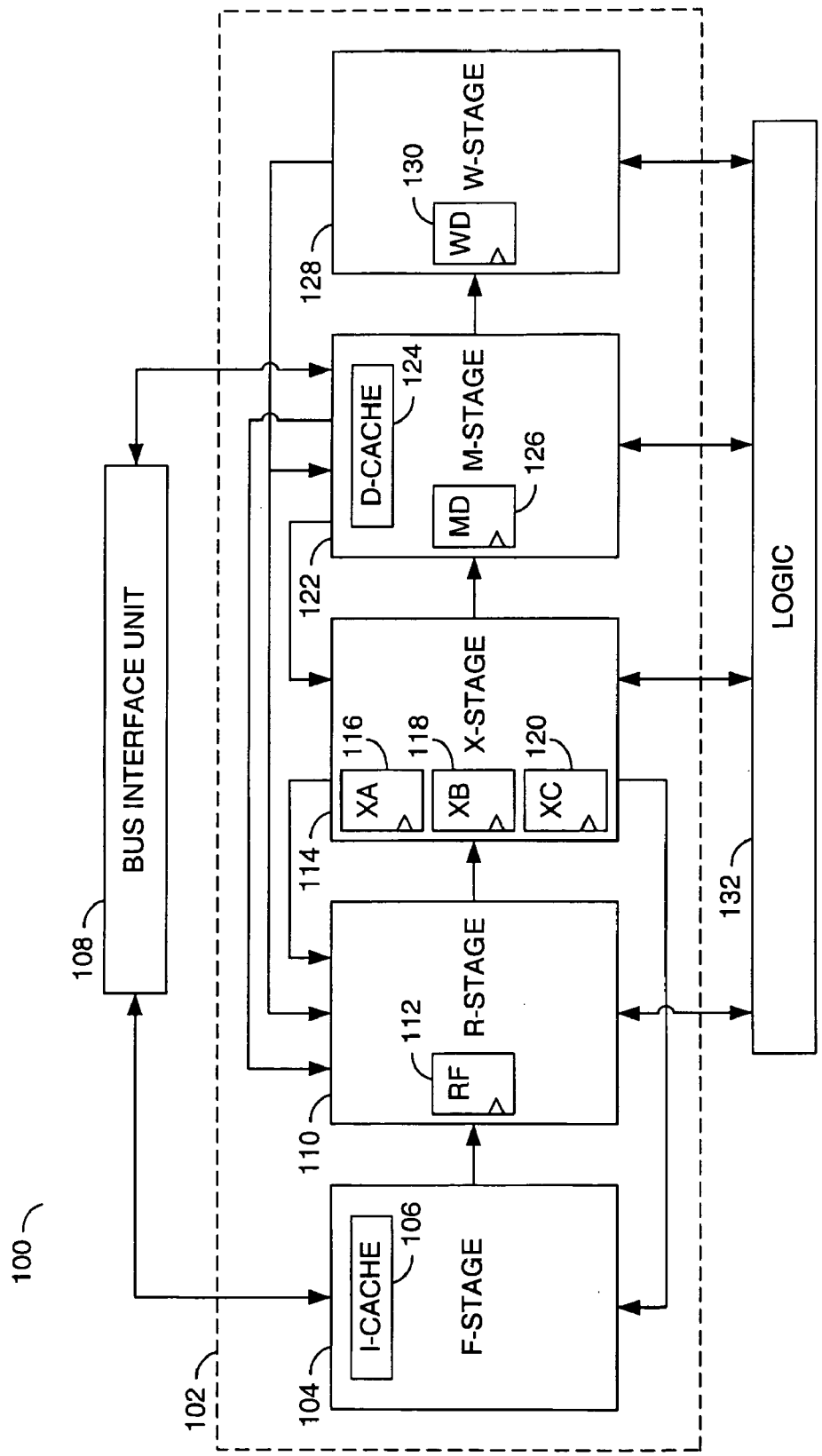
FIG. 1 is a functional block diagram of a pipelined processor implementing the present invention.

FIG. 1 is a functional block diagram of a pipelined processor 100 illustrating an implementation of the present invention. The processor 100 has a five-stage pipeline 102 in the preferred embodiment. Other sizes of pipelines and parallel pipelines may also be used within the scope of the present invention.

A fetch-stage (F-stage) 104 of the pipeline 102 is responsible for fetching instructions. The F-stage 104 includes an instruction cache (I-cache) 106 organized as two-way set associative. The I-cache 106 is updated from a main memory (not shown) through a bus interface unit 108.

An instruction decode/register fetch stage (R-stage) 110 is provided following the F-stage 104. The R-stage 110 decodes each instruction presented by the F-stage 104 and then fetches any required data. The R-stage 110 contains 32 data registers, depicted as a register file 112, that buffers operands for instructions.

An execution stage (X-stage) 114 performs arithmetic operations on the data fetched in R-stage 110. The data may be presented by the register file 112 or bypassed from earlier issued instructions in the pipeline The X-stage 114 generally contains multiple registers. In the present example, an XA register 116, an XB register 118, and an XC register 120 buffer data presented by the R-stage 110. Data produced by the X-stage 114 can be presented to the R-stage 110 and to a memory stage 122. A program counter address may also be presented by the X-stage 114 to the F-stage 104 to account for jump instructions in the instruction flow.

The memory stage (M-stage) 122 is responsible for storing data presented by the X-stage 114 into a data cache (D-cache) 124 and loading data from the D-cache 124 into other registers. The D-cache 124 is organized as two-way set associative. Other organizations of the D-cache 124 may be employed within the scope of the present invention. Data in the D-cache 124 is updated to and from the main memory (not shown) through the bus interface unit 108. The M-stage 122 includes a memory data register (MD) 126 that buffers data to be stored in the D-cache 124. In most cases, the MD register 126 will buffer results that are to be stored in the register file 112. Data in the M-stage 122 can be presented to the X-stage 114, the R-stage 110, and a write-back stage 128.

The write-back stage (W-stage) 128 has a write data register (WD) 130 that buffers data presented by the M-stage 122. Data buffered in the WD register 130 may be presented back to the R-stage 110 and the M-stage 122. Data buffered by the WD register 130 is usually simultaneously stored in the register file 112. However, since the data in the register file 112 cannot be accessed in the R-stage 110 until one cycle later, then the duplicate data buffered in the WD register 130 may be used instead.

Logic 132 is connected to the pipeline 102 to allow stalling in the pipeline 102, and thus of the processor 100, to be delayed when possible. The logic 132 interfaces with the register file 112, XA register 116, XB register 118, XC register 120, MD register 126, and WD register 130. These six registers are generically referred to hereinafter as the pipeline registers.

Figure 2:
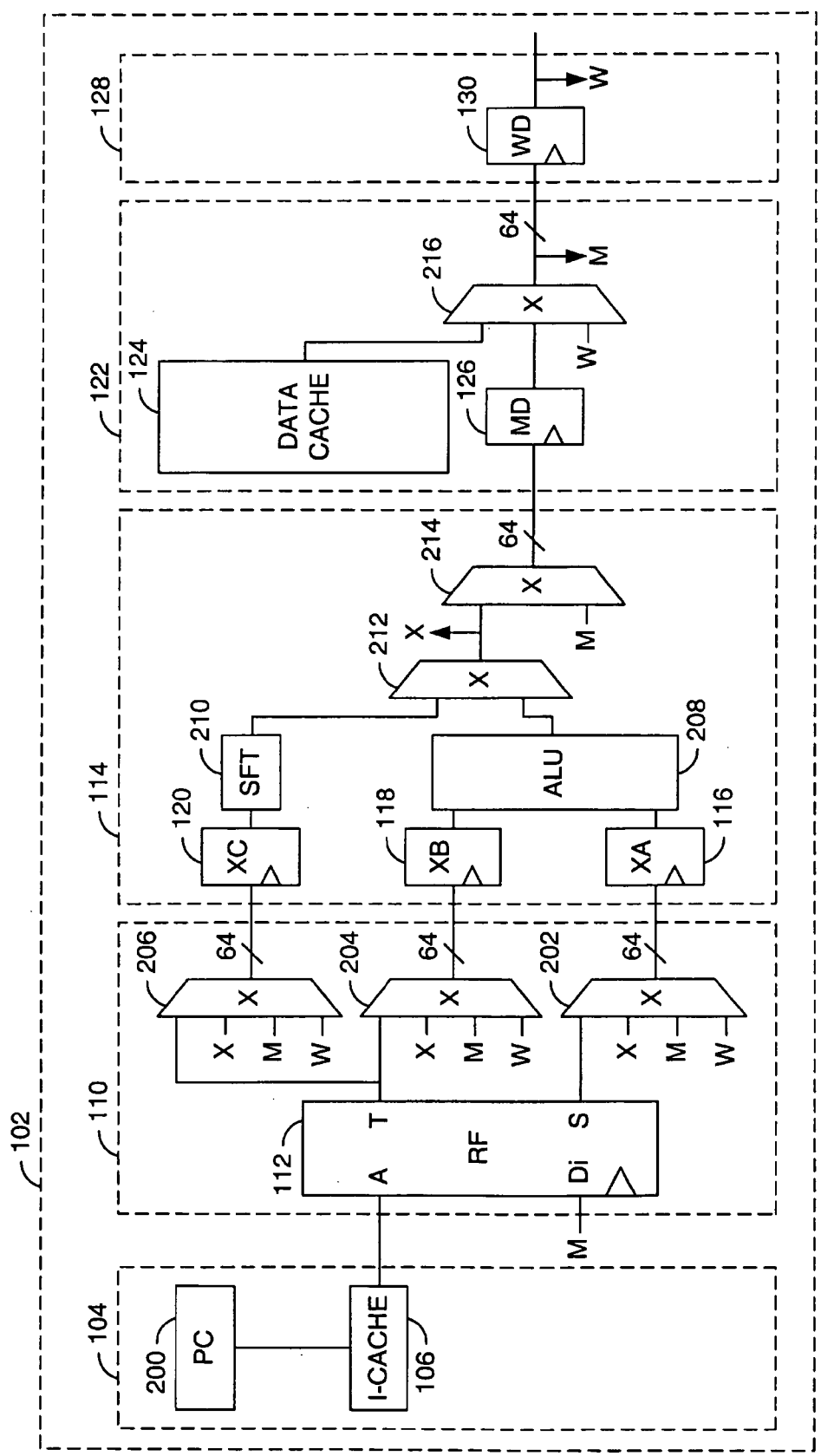
FIG. 2 is a partial functional block diagram of the pipeline.

FIG. 2 shows additional detail of the pipeline 102 example. A program counter (PC) 200 provides an address of the instruction being fetched by the F-stage 104. Ideally, the PC 200 identifies an instruction already buffered in the I-cache 106.

Multiple multiplexers 202, 204 and 206 are provided in the R-stage 110. These multiplexers 202, 204 and 206 are used to select a source of data presented to the XA 116, XB 118 and XC 120 registers respectively in the X-stage 114.

The X-stage 114 includes an arithmetic logic unit (ALU) 208 and a shifter (SFT) 210 for operating on the data buffered by the XA 116, XB 118, and XC 120 registers. Multiple multiplexers 212 and 214 in the X-stage 114 are used to select a source of data presented to the MD register 126 in the M-stage 122. The M-stage 122 contains another multiplexer 216 for use in selecting a source of data to be presented to the WD register 130 in the W-stage 128.

Figure 3:
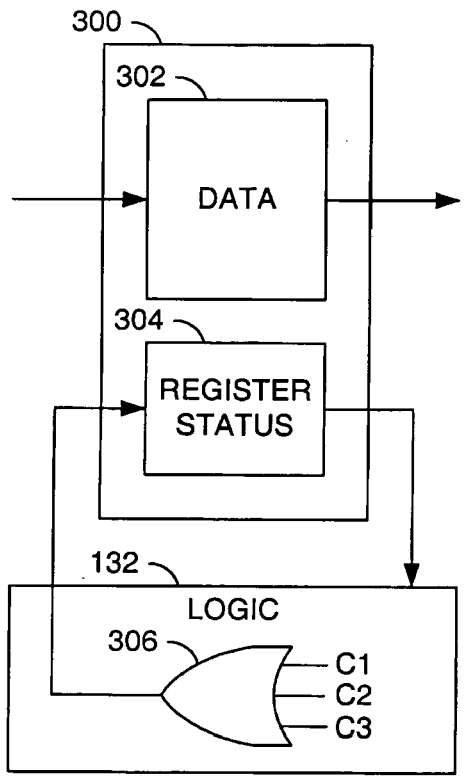
FIG. 3 is a detailed diagram of a portion of the present invention.

Referring to FIG. 3, each of the pipeline registers 300 typically use multiple bits 302 to buffer data. The present invention adds at least one bit 304 to the pipeline registers 300 to buffer a register status. A single bit 304 buffering the register status may indicate either a valid status or an invalid status. The register status is generated by the logic 132 for loading into one or more pipeline registers 300. Logic 132 also reads the register status from the pipeline registers 300 to determine the validity of the data stored in the multiple bits 302.

The embodiment of the logic 132 shown in FIG. 3 is an example where the register status is stored as a single bit 304 in each pipeline register 300. Here, three different conditions C1, C2 and C3 are used to indicate that the data buffered by register 300 is invalid. A logical OR function 306 is implemented by the logic 132 to set the register status to the invalid state whenever one or more of the conditions C1, C2 or C3 indicate that the data is invalid. The register status presented by each pipeline register 300 to the logic 132 is thus a single bit.

Figure 4:
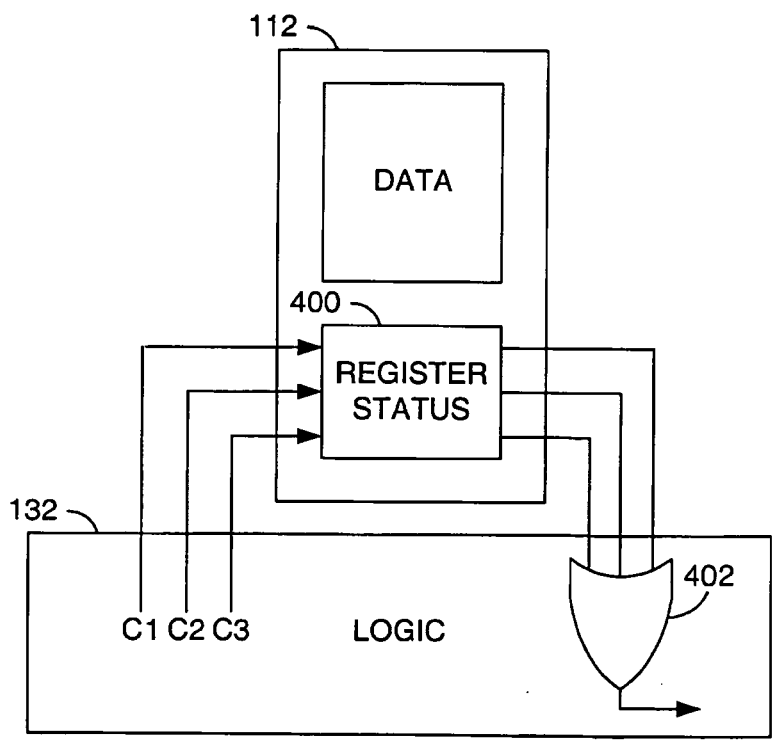
FIG. 4 is another detailed diagram of another portion of the present invention.

Referring to FIG. 4, an example of the register file 112 is shown where the register status is buffered as three bits 400 within the register file 112. Each of the three bits 400 holds one of the three conditions C1, C2 and C3 that may indicate that the buffered data is invalid. In this example, the logic 132 implements a logical OR function 402 to combine the three bits 400 into one register status. If any one of the three conditions C1, C2 or C3 presents the invalid state to the logic 132, then the logical OR function 402 presents the register status as the invalid state.

It will be apparent to one skilled in the art that the example implementations shown in FIG. 3 and FIG. 4 are easily modified. For example, the logical states of conditions C1, C2 and C3 may be inverted so that the register status is determined using a logical AND function. In another example, conditions C1 and C2 may be logically OR'd together and buffered by one bit with condition C3 being buffered by a second bit. In still another example, the register status may be physically separated from the data registers. In such cases of physical separation there is a logical connection between the register status bits and the data registers. It will also be apparent that other numbers of bits may be implemented for buffering the register status. Additionally, other numbers of conditions may be used to indicate when the buffered data is invalid.

In an example embodiment, the register status is buffered in the pipeline registers as up to three bits. Consider first the X-stage 114. The XA register 116, XB register 118, and XC register 120 have a first bit used to indicate invalid data received from the register file 112. A second bit is used to indicate that the data has been received from an M-stage 122 load or conditional store. A third bit is used to indicate that a load in the M-stage 122 missed in the D-cache 124 or there was a conditional store.

This third bit is stored in only one place and made available globally for all pipeline registers. This approach takes into account the fact that a load cache-miss is detected late in the clock cycle. By storing this information in one place (e.g., the third bit) then the load cache-miss status does not have to propagate to multiple status bits in multiple locations. A short path between the cache-miss detection logic and the third status bit results in a short propagation delay. The longer the propagation delay, the longer the current pipeline cycle must extend to tag the data as invalid. To determine the validity of an X-stage register 116, 118, and 120 the condition of the first, second, and third status bits are examined.

In the M-stage 122 the first status bit is associated with a different condition. Here, the first bit is used to indicate that the MD register 126 has received data from an invalid X-stage register 116, 118, or 120.

In the R-stage 110, there is no condition for the first bit. The register file 112 is associated with only the second and third status bits. The register file 112, however, has a unique status register associated with it to help distinguish between the 15, 32 actual data registers. Only one of the data registers can be marked as invalid at any given time. The unique register indicates which of the 32 data registers holds the invalid data.

The WD register 130 does not require a private set of status bits in this example embodiment. The WD register 130 is used to hold the same data as the register file 112. Consequently, the valid/invalid status of the WD register 130 will be the same as the register file 112.

Figure 5:
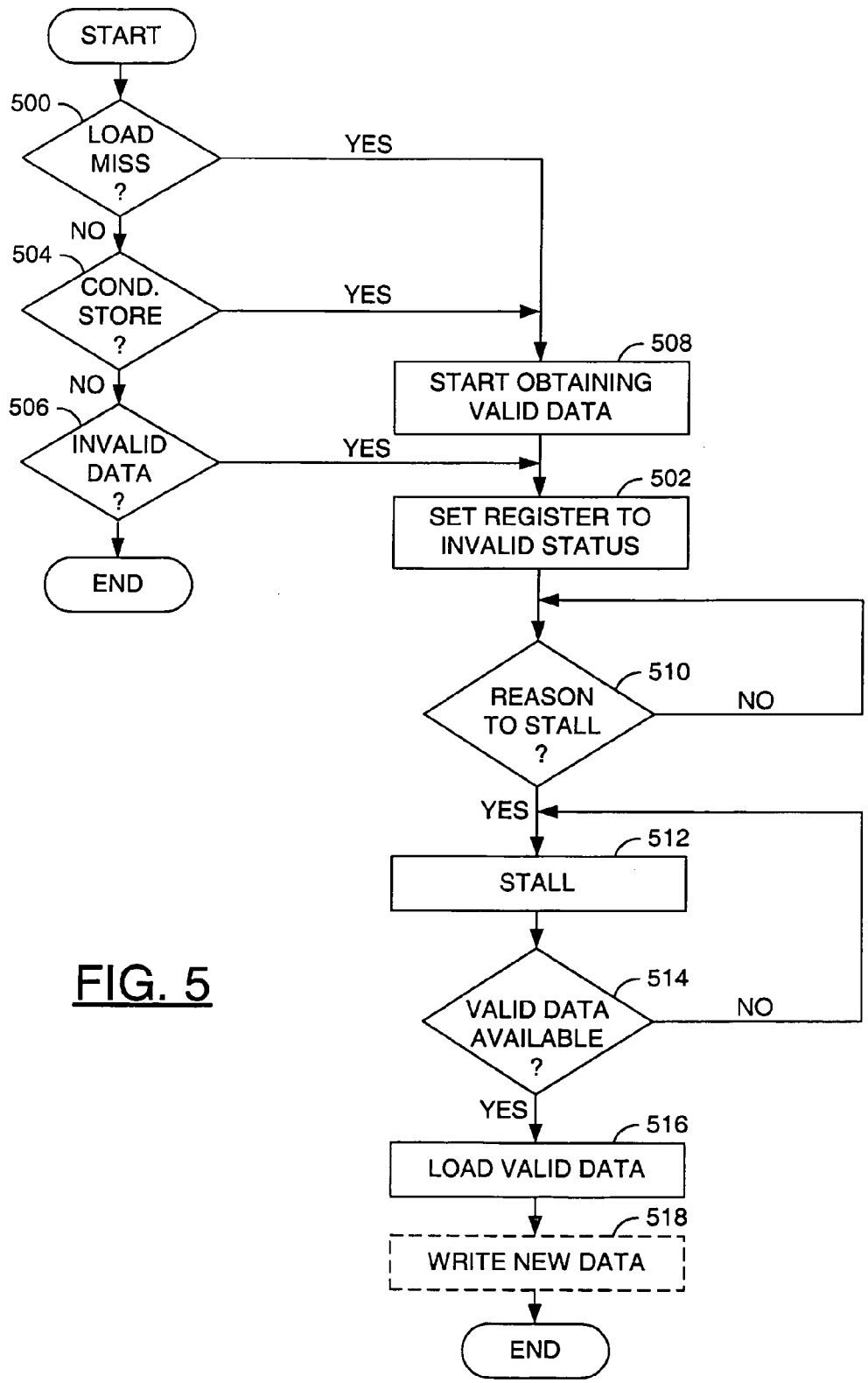
FIG. 5 is a flow diagram of a method of recovering from a load cache-miss.

Referring to FIG. 5, a method of operating the processor 100 to recover from registering invalid data is described. One condition that may result in invalid data being stored in a register is a cache-load miss from the D-cache 124. When a load cache-miss occurs (e.g., the YES branch of decision block 500) then the pipeline register that should have received the valid data does not, and thus is left buffering invalid data. Detection of the cache-load miss condition will trigger the BIU 108 to obtain valid data from the main memory, as shown in block 508. The logic 132 also sets the register status of that pipeline register to the invalid state, as shown in block 502. Setting the register status to the invalid state may take place before, after, or in parallel with fetching the valid data from the main memory.

Another second condition that may result in invalid data in one of the pipeline registers is a conditional store (e.g., the YES branch of decision block 504). In this case, the logic 132 sets the register status of the pipeline register or registers buffering the conditional store data to the invalid state, as shown in block 502, and the BIU fetches the valid data from the main memory, as shown in block 508.

A third condition is where one pipeline register buffering invalid data transfers the invalid data to another pipeline register (e.g., the YES branch of decision block 506). Here, the status of one pipeline register is flowed to a receiving pipeline register.

Detection of the cache-load miss condition and the conditional store condition triggers the BIU 108 to obtain valid data from the main memory, as shown in block 508. Execution in the processor 100 may continue while the BIU 108 is obtaining the valid data as long as the valid data is not required by an instruction for proper execution or new data is not about to be written into the pipeline register (e.g., the NO branch of decision block 510). In general, most instructions need valid data (e.g., operands) in the X-stage 114. Exceptions to this general rule are store instructions that simply pass the invalid data along to the MD register 126 in the M-stage 122. In these situations, the invalid data does not require correction until the M-stage 122 attempts to store the invalid data into the D-cache 124.

Several conditions may trigger a stall (e.g., the YES branch of decision block 510). One condition is that the valid data will be required for proper execution of an instruction. Another condition is that the BIU 108 returns with the valid data. Still another condition is that an instruction is about to overwrite the invalid data with new data while the BIU 108 is busy obtaining the valid data. If one or more of these conditions occur then the processor will stall, as shown in block 512. After the valid data is available and the processor is stalled (e.g., the YES branch of decision block 514), then all invalid pipeline registers are updated with valid data, as shown in block 516. The register status of the updated pipeline registers are also reset to the valid state.

A stall initiated only because valid data has been entered into the D-cache 124 requires one cycle to correct the pipeline registers. A stall initiated because an instruction requires valid data or because new data is about to overwrite the invalid data may last several cycles while the valid data is obtained and loaded.

In cases where the stall was due to new data about to overwrite the invalid data, then the valid data is first allowed to correct the invalid data, as shown in block 516. The new data may then be written over the valid data, as shown in block 518. If the pipeline 102 is not stalled before writing new data, then the newly written data will be shortly replaced with the "valid data" obtained from memory by the BIU 108. Alternatively, a mechanism may be provided to cancel the correction since the invalid data has been eliminated by the write.

Additional conditions may be defined that require the pipeline 102 to stall. For example, design of the logic 132 may be kept simple if only one load or conditional store can be scheduled in the pipeline 102 simultaneously. While the BIU 108 is obtaining the valid data, any subsequent load or conditional store could be stalled in the M-stage 122. This way, a one load cycle of valid data can be used to correct all instances of the invalid data in the pipeline registers simultaneously. Conversely, if multiple invalid data types are allowed to exist in the pipeline 102 simultaneously, then the logic 132 must be able to distinguish among individual invalid data types for correction.

Still another example where stalling is required is a jump based upon data in a pipeline register. If the register is buffering invalid data then the jump should be stalled until the invalid data is corrected.

The present invention may be implemented by the preparation of ASICs, FPGAs, or by interconnecting an appropriate network of conventional components circuits that will be readily apparent to those skilled in the arts.

While the invention has been particularly shown and described with reference to the preferred embodiments thereof, it will be understood by those skilled in the art that various changes in form and details may be made without departing from the spirit and scope of the invention.

What is claimed is:

1. A method of recovering from invalid data in a first register within a pipelined processor, comprising the steps of:

(A) setting a first status for said first register to an invalid state in response to a first operand data in said first register being invalid;
 (B) stalling said processor in response to both (i) an instruction requiring said first operand data and (ii) said first status being in said invalid state;
 (C) obtaining a second operand data from a memory in response to a conditional store for said first operand data in said first register; and
 (D) stalling said processor in response to completing said obtaining to enable said second operand data to be written in said first register.

2. The method of claim 1, further comprising the step of: setting said first status to said invalid state in response to a conditional store for said first operand data in said first register.

3. The method of claim 1, further comprising the step of: setting said first status to said invalid state in response to said first register receiving a third operand data from a second register, said second register having a second status in said invalid state prior to transferring said third operand data to said first register.

4. The method of claim 1, further comprising the step of: stalling said processor prior to obtaining said second operand data to prevent a third operand data from being written in said first register before said second operand data is written in said first register.

5. The method of claim 1, further comprising the step of: buffering said first status as a plurality of bits to provide for multiple conditions that would indicate said invalid state.

6. The method of claim 1, further comprising the step of: setting said first status to said invalid state in response to a miss for a read from a data cache of a third operand data to be written in said first register.

7. The method of claim 6, further comprising the steps of: obtaining said third operand data from said memory in response to said miss; and
stalling said processor in response to obtaining said third operand data to enable said third operand data to be written in said first register.

8. The method according to claim 1, further comprising the step of:
continuing operation in a stage of said pipelined processor containing said first operand data in response to no instruction requiring said first operand data while said first status is in said invalid state.

9. A pipelined processor comprising:
a first register configured to buffer (i) a first operand data and (ii) a first status unique to said first operand data;
logic configured to (i) set said first status to an invalid state in response to said first operand data being invalid and (ii) stall said processor in response to both (a) an instruction requiring said first operand data and (b) said first status being in said invalid state; and
a bus interface unit configured to obtain a second operand data from a memory in response to a conditional store for said first operand data in said first resister, wherein said logic is further configured to stall said processor in response to completing said obtain to enable said second operand data to be written in said first register.

10. The pipelined processor of claim 9, wherein said logic is further configured to set said first status to said invalid state in response to a conditional store for said first operand data in said first register.

11. The pipelined processor of claim 9, further comprising a second register, wherein said logic is further configured to set said first status to said invalid state in response to said first register receiving a third operand data from said second register, said second register having a second status in said invalid state prior to transferring said third operand data to said first register.

12. The pipelined processor of claim 9, wherein said first status comprises a plurality of bits to provide for multiple conditions that would indicate said invalid state.

13. The pipeline processor of claim 12, wherein said logic comprises a first logic gate configured to combine said bits of said first status read from said first register.

14. The pipelined processor of claim 9, wherein said logic is further configured to set said first status to said invalid state in response to a cache load-miss for said first register.

15. The pipeline processor of claim 9, wherein said logic comprises a first logic gate configured to combine a plurality of bits to form said first status written to said first register.

16. The pipelined processor of claim 9, wherein said pipelined processor is configured to continue operating in a stage containing said first operand data in response to no instruction requiring said first operand data while said first status is in said invalid state.

17. A pipelined processor comprising:
   a first register configured to buffer (i) a first operand data and (ii) a first status;
   logic configured to (i) set said first status to an invalid state in response to said first operand data being invalid and (ii) stall said processor in response to both (a) an instruction requiring said first operand data and (b) said first status being in said invalid state; and
   a bus interface unit configured to obtain a second operand data from a memory in response to a miss for a read from a data cache of said second operand data to be written in said first register, wherein said logic is further configured to (i) stall said processor in response to completing said obtaining of said second operand data and (ii) write said second operand data in said first register in response to stalling said processor.

18. The pipelined processor of claim 17, wherein said logic is further configured to stall said processor while said bus interface unit is said obtaining said second operand data to prevent a third operand data from being written in said first register.

19. The pipelined processor of claim 18, wherein said logic is further configured to write said third operand data in said first register in response to writing said second operand data in said first register.

20. A pipelined processor comprising:
   means for buffering a first operand data;
   means for buffering a first status unique to said first operand data;
   means for setting said first status to an invalid state in response to said first operand data being invalid;
   means for stalling said processor in response to both (i) an instruction requiring said first operand data and (ii) said first status being in said invalid state;
   means for obtaining a second operand data from a memory in response to a miss for a read of said second operand data from a data cache; and
   means for stalling said processor in response to completing said obtaining to enable said second operand data to be written in said means for buffering said first operand data.

21. A method of recovering from invalid data in a first register within a pipelined processor, comprising the steps of:
   (A) setting a first status for said first register to an invalid state in response to a first operand data in said first register being invalid;
   (B) stalling said processor in response to both (i) an instruction requiring said first operand data and (ii) said first status being in said invalid state;
   (C) obtaining a second operand data from a memory in response to a miss for a read of said second operand data from a data cache; and
   (D) stalling said processor in response to completing said obtaining to enable said second operand data to be written in said first register.

22. The method of claim 21, further comprising the step of:
   stalling said processor prior to obtaining said second operand data to prevent a third operand data from being written in said first register before said second operand data is written in said first register.

* * * * *